Dec. 11, 1973     D. D. WOOLLEY     3,778,495
CONTINUOUS PROCESS OF MANUFACTURING POLYMERIC COMPOSITION
WRITING POINTS AND DEVICES
Filed Jan. 24, 1972     4 Sheets-Sheet 1
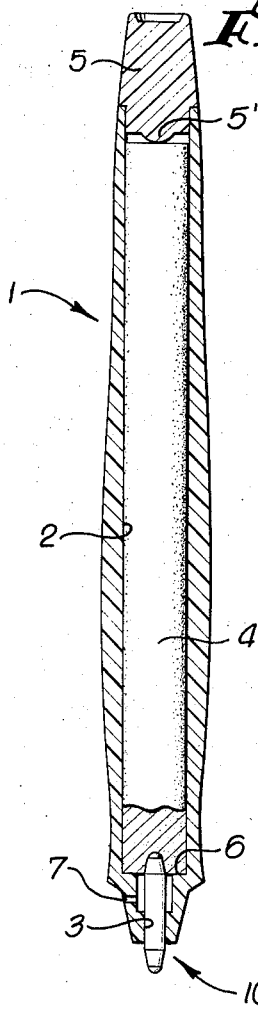
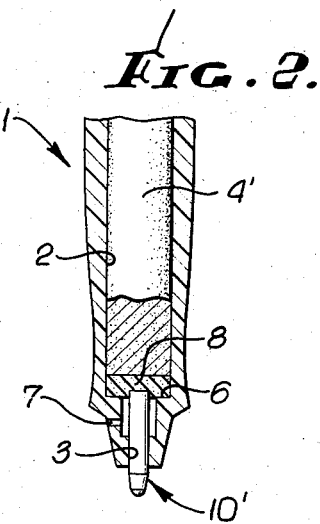
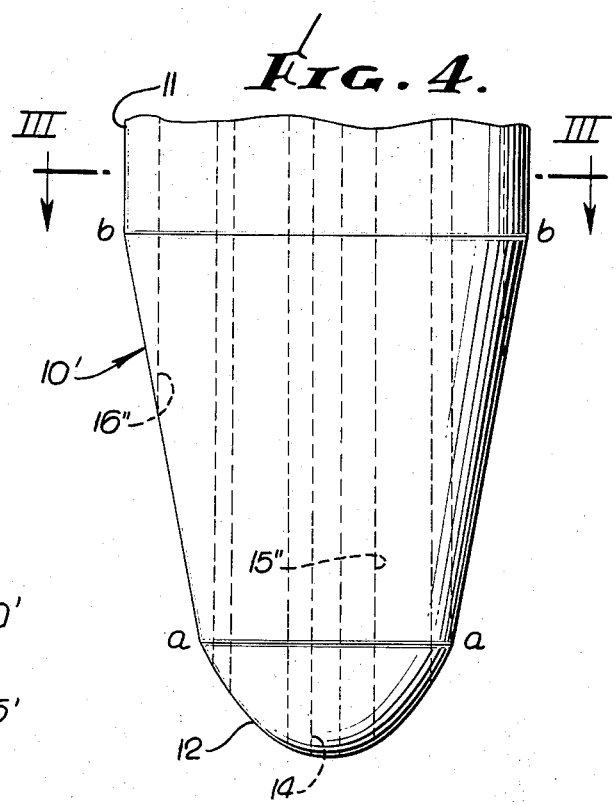
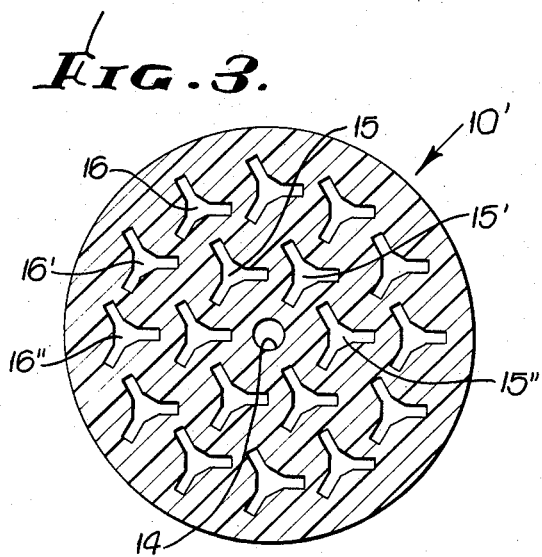

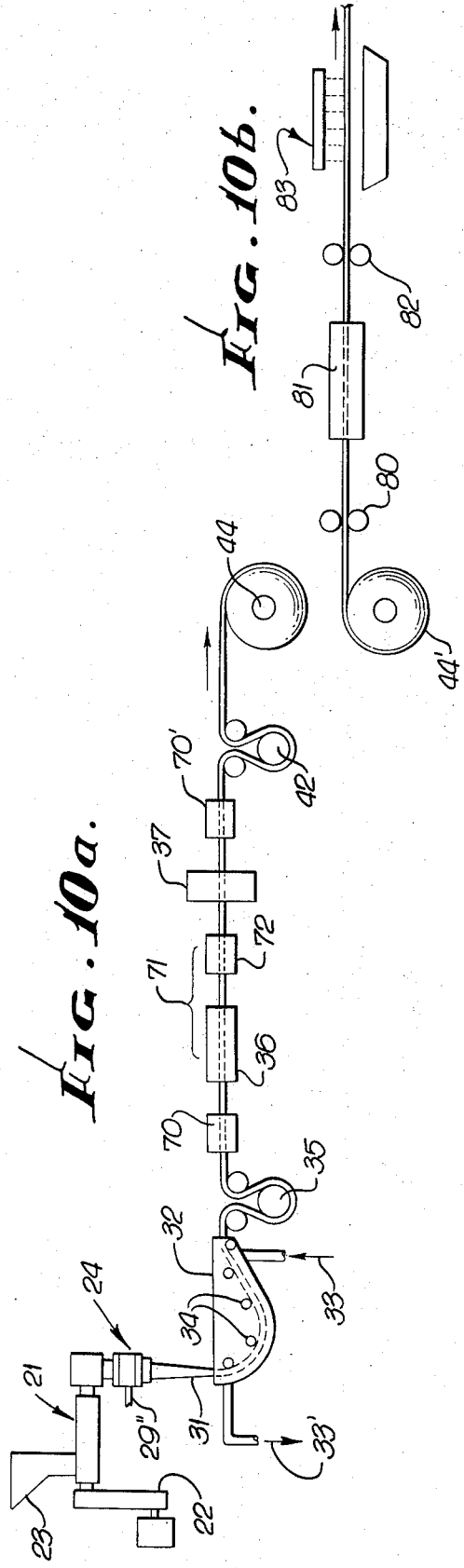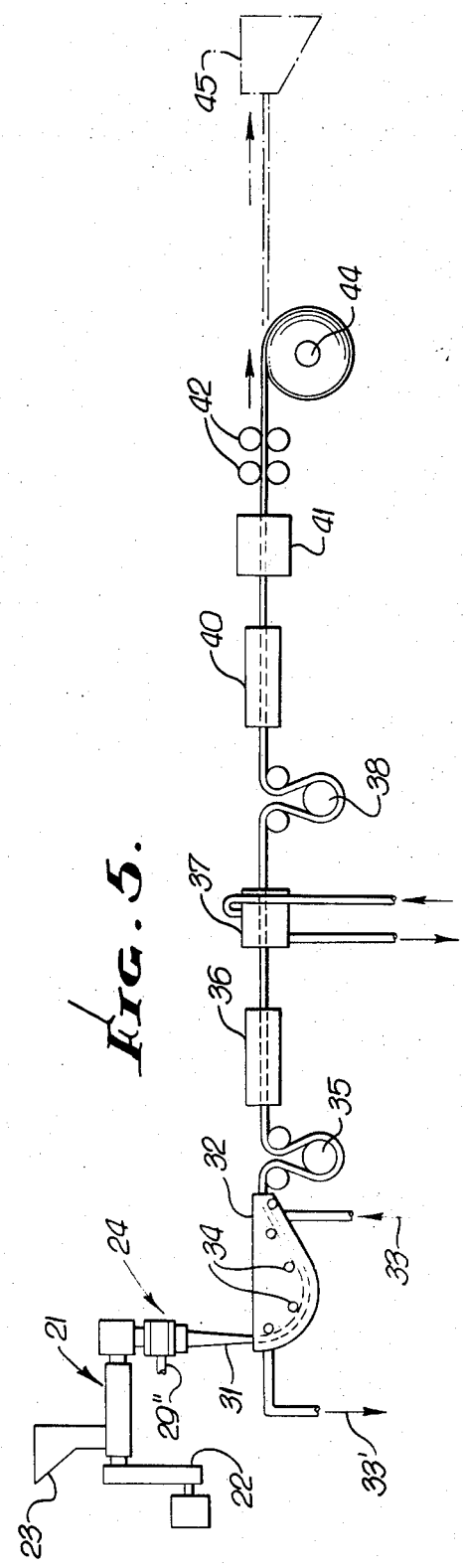

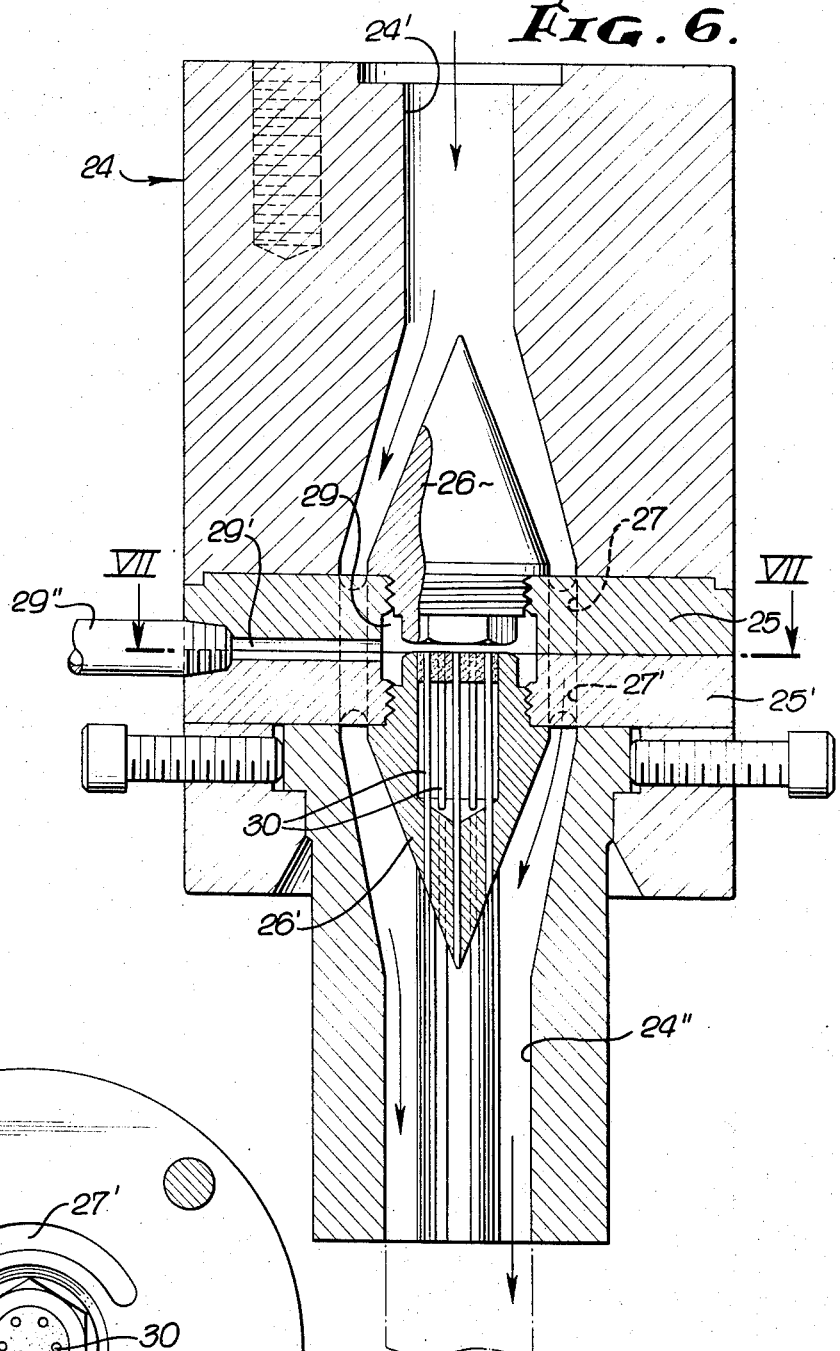
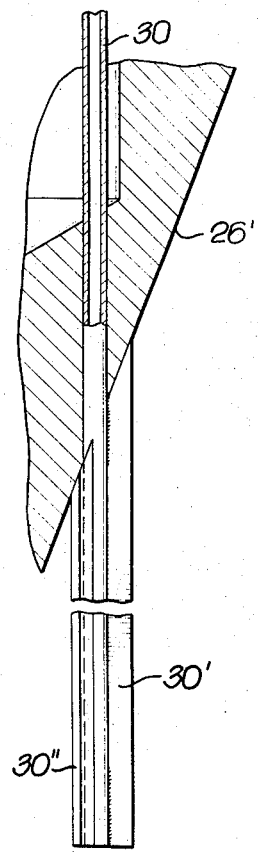
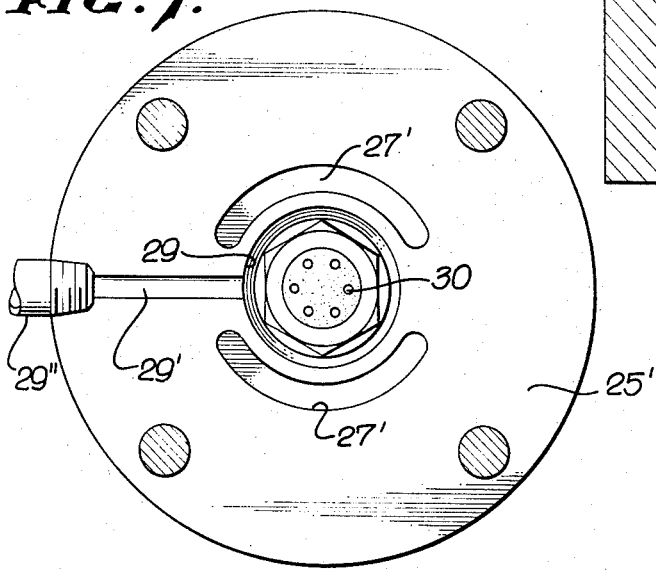
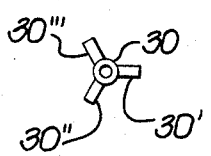

United States Patent Office 3,778,495
Patented Dec. 11, 1973

3,778,495
CONTINUOUS PROCESS OF MANUFACTURING POLYMERIC COMPOSITION WRITING POINTS AND DEVICES
Donald D. Woolley, Alhambra, Calif., assignor to The Gillette Company, Santa Monica, Calif.
Continuation-in-part of application Ser. No. 53,571, July 9, 1970. This application Jan. 24, 1972, Ser. No. 220,209
Int. Cl. B28h 21/54; B29f 3/00
U.S. Cl. 264—177 F                  12 Claims

ABSTRACT OF THE DISCLOSURE

Relates to a method of manufacturing homogeneous, unitary writing elements in a continuous manner whereby the structural and physical properties of a synthetic thermoplastic polymer (or co-polymer) can be utilized at best advantage. The methods herein disclosed are particularly directed to the production of writing elements having a gross cross-sectional area not appreciably greater than 32,000 square mils, such elements having a plurality of minute ink-conveying channels distributed within a circumaxial area not appreciably exceeding one-fourth of the gross cross-sectional area of the element, the aggregate cross-sectional area of the channels being less than about 4% of the gross area of the element. The method utilizes and discloses steps and conditions of extruding and melt-drawing a polymer and then reforming the internal portions of the extruded body by a compressive drawing operation, under stated conditions, to obtain channels of desired size. As a further step the extruded article may be stabilized and relieved of internal stresses by annealing.

RELATED APPLICATIONS

This application is a continuation-in-part application of copending Ser. No. 53,571 filed July 9, 1970.

BACKGROUND OF THE INVENTION

The present invention relates to writing instruments which employ writing tips capable of utilizing liquid inks. In recent years writing tips made of synthetic filaments bonded to each other with a resinous bonding agent have been used in very large quantities. Difficulties have been experienced in providing fibrous writing tips which will withstand axial and lateral writing pressure forces without fraying or brushing out; performance in terms of their ability to deposit a trace which was of constant or uniform width, with uniform laydown of ink, left something to be desired.

The present invention eliminates the necessity of employing the fibrous or filamentary materials and instead contemplates the production of an elongated unitary writing element composed of a homogeneous mass of synthetic thermoplastic polymer, whereby the physical characteristics of the polymer may be utilized to best advantage with resulting longer effective life. Strength and rigidity of the writing element is enhanced by making the body of a homogeneous integral mass of synthetic thermoplastic polymer, and the ability to write with the very narrow trace with the axis of the writing element at an angle of said 25°–60° from the perpendicular to the writing surface, irrespective of rotation of the element around its axis is enhanced by providing an axial channel and a plurality of spaced channels all of which extend longitudinally through the writing element and emerge onto the contoured surface of the element at its tip. In accordance with the present invention it has been found that the desired strength, rigidity and long life as well as uniform fine writing ability can be obtained by having the shank or body portion of the writing element have an outside diameter of not over 0.2 inch and preferably between about 0.12 inch and 0.08 inch in diameter, with substantially all of the minute ink-conveying channels traversing an axial portion which can be embraced by a circle of between about 0.01 inch to about 0.07 inch in diameter, the latter cross-sectional area constituting not appreciably more than 50% and preferably 30%–40% of the shank diameter.

It may be stated at this time that the aggregate cross-sectional area of all of the channels which emerge on the contoured end or tip of the writing element, may constitute less than about 4% of the gross area of the shank. Specific sizes and distributions of the various channels will be disclosed in greater detail hereafter.

One of the primary objectives of this invention is to provide a continuous method of manufacturing a writing element of wear resisting homogeneous thermoplastic synthetic composition, provided with longitudinally extending axial channel and a plurality of satellite, longitudinally extending ink-conveying channels surrounding but spaced from the axial channel (all of said channels terminating in a contoured surface of a writing tip of said element) the resulting element being adapted to produce a desirable ink trace with the axis of said element at a variety of inclinations or degrees of rotation to the surface being written upon. Preferably, the axial and satellite channels can be connected by capillary channels which are smaller than the ink-conveying channels and capable of constantly supplying the ink-conveying channels with ink from a reservoir with which one end of the writing element is in contact, the other end being contoured and constituting the writing tip.

Another important object of this invention is to disclose and provide a method of continuously manufacturing homogeneous writing elements from a thermoplastic synthetic composition and compensating for the various flow and shrinkage characteristics of such compositions in order to be able to produce efficient writing elements having ink-conveying and ink-feeding channels of suitable sizes interconnected to produce writing elements having desirable and effective writing characteristics, long life and freedom from interruption of such desirable characteristics due to shock, etc.

Although descriptions of methods used in extruding synthetic plastics in the form of tubing and pipe have been published several years ago such methods cannot be employed in the commercial production of small diameter relatively rigid writing tips. It has been found that totally different and new problems are encountered when it is desired to make a writing tip of small diameter, containing not a single large axial channel (as in tubing) but a plurality of distributed channels of minute size.

In conventional pipe and tubing the open, fluid conducting cross-sectional area may constitute as much as 90%–96% of the gross cross-sectional area; in pipe and tubing made from plastic compositions the open cross-sectional area may comprise 45%–75% of the gross area; in thin walled small diameter flexible tubing of the type used for intravenous injections and blood transfusions, the single open area may comprise from about 21%–45% of the gross cross-sectional area.

In contrast to such tubing and pipe, the present invention is directed to the continuous production of small diameter, elongated writing tips which are rigid, strong, homogeneous and include, in addition to an axial channel, a plurality of longitudinally extending minute channels, generally of capillary dimensions, capable of conveying ink from a reservoir to a contoured end surface of such tip or writing element so as to permit writing with the axis of the element at various angles to the writing surface. The various channels may be spaced or be interconnected, but be able to retain and convey ink to the end portion of the tip during fast writing and to be immediately available to start writing even after protracted nonuse. The polymeric or synthetic plastic should have a low coefficient of friction so as to resist wear; the width of the trace produced should be uniform. These various requirements and uses are totally different from those encountered in the production of tubing.

One of the primary problems presented was the apparent impossibility of obtaining an extruded, virtually rigid object having an outside diameter of about 0.1 inch with an axial aperture or channel of not over 0.005 and preferably of about 0.001–0.003 inch in diameter, and a plurality of smaller channels radiating from the axial channel. For example, when an axial mandrel of only 0.020 inch in diameter, with six spaced parallel sided radial fins connected thereto (each about 0.010 inch thick and 0.15 inch in radial dimension) was used in an extrusion die having an opening 0.45 inch in diameter, a 4:1 melt draw into a quenching bath produced a product having an OD of about 0.11 inch but the axial opening therein was larger than 0.008 in diameter. The 4:1 reduction in OD resulted in only a 2.5:1 reduction in the size of the axial channel. Moreover, a large part of each radial channel adjacent the axial channel was excessively wide, the width varying from 0.003 inch to 0.005 inch. The object produced was not adapted for use as a tip for writing instruments since the channels were excessively large in the apex or contoured area, did not leave a fine line trace, the tips became excessively wet with ink when subjected to relatively minor shaking and the ink column would be broken when the writing instrument was dropped or jolted, thereby becoming inoperative for continuous writing.

It was discovered that the above unsatisfactory results were due, in large part, to the shrinkage of the large internal body portions of the extruded and melt drawn object. The exterior of the melt drawn object chilled and solidified rapidly in the quenching bath, but the internal, relatively V-shaped portions continued to cool and shrink toward the exterior shell and toward their own centers of mass. The present invention is directed to methods which permit melt drawing but which overcome and correct such shrinkage and permit the continuous manufacture of objects having minute channels of desired dimensions, such objects being eminently suited for use as writing points for writing instruments. A further object of the present invention is to disclose and provide an unusual mandrel which is eminently suited for use in carrying out the invention and obtaining the objectives hereinbefore described.

Other objects and advantages of the present invention will become apparent to those skilled in this art from the following more detailed description of various embodiments. In order to facilitate understanding reference will be had to the appended drawings in which:

FIG. 1 is a longitudinal section of a writing instrument employing a writing element of the present invention;

FIG. 2 is a similar longitudinal section of a somewhat modified form of writing instrument embodying a modified form of writing element;

FIG. 3 is a transverse section through one embodiment of a unitary writing element contemplated by the present invention;

FIG. 4 is a side elevation of the tip portion of the writing element illustrated in FIG. 3;

FIG. 5 is a diagrammatic representation of exemplary equipment and steps in one form of method of the present invention;

FIGS. 6 and 7 are enlarged views in longitudinal and transverse section respectively, of an exemplary die assembly which may be employed in carrying out the method;

FIG. 8 is an enlarged fragmentary portion of one form of mandrel and holder, partly in section;

FIG. 9 is an end view of the mandrel shown in FIG. 8;

Figure 11:
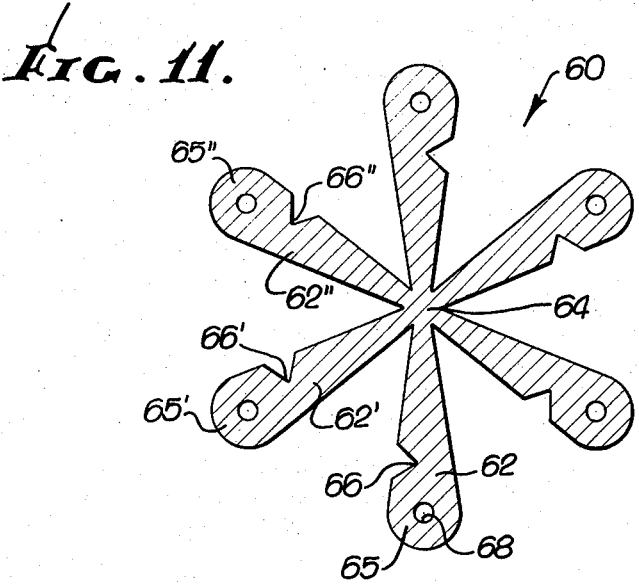
Figure 12:
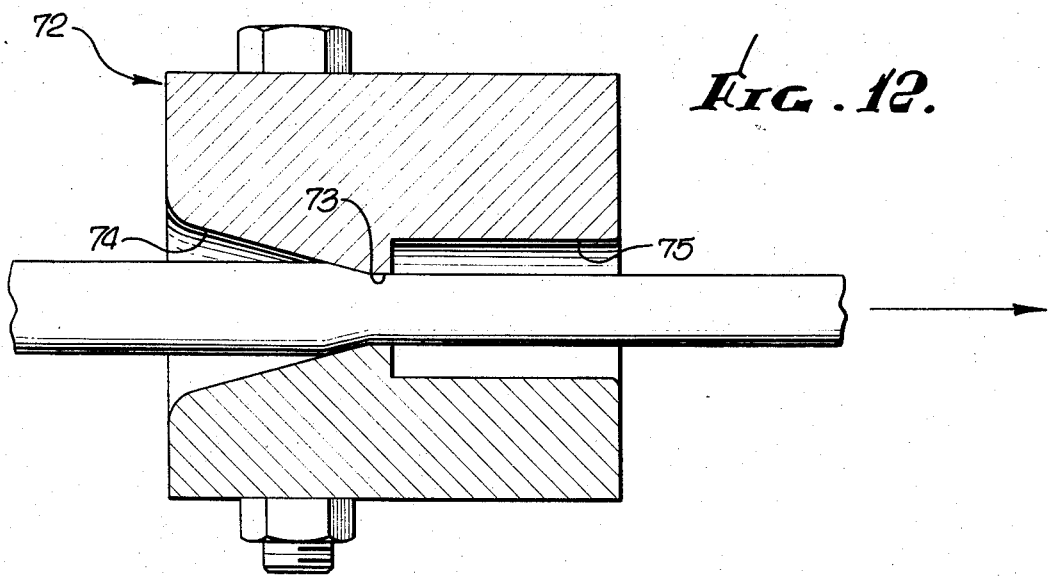
Figure 13:
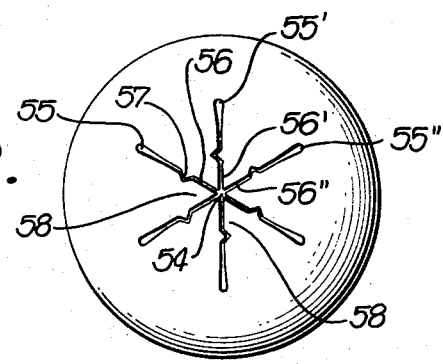

FIGS. 10($a$) and 10($b$) diagrammatically illustrate a preferred method of continuously manufacturing homogeneous writing tips having the characteristics desired by the present invention;

FIG. 11 is a transverse section through a form of mandrel particularly adapted for use in the method of FIGS. 10($a$) and 10($b$);

FIG. 12 is a longitudinal section through a device employed in the channel correction zone of the process;

FIG. 13 is a partial transverse section through a completed writing tip illustrating the form and size of channels formed in a typical product of the process.

The many required properties and characteristics of a writing element may be obtained by the use of synthetic thermoplastic polymer compositions which can be melted and extruded. Acrylic polymers such as polyacrylonitrile and poly(methylmethacrylate), acetal polymers such as polyoxymethylene (Delrin), polyamides such as poly-(hexamethyleneadipamide) (nylon), polyesters such as poly(ethyleneterephthalate), and polypropylene, can be employed, as well as copolymers including the above. These polymers have a density of between about 1.3 and 1.55 gm./cm.$^3$ and the presence of fillers, additives and reinforcing agents may increase the density to 1.75. Since strength and toughness are desired and the cohesive energy density of Delrin, nylon and the polyesters is high, these thermoplastic polymers are preferred. A low coefficient of friction and high abrasion resistance are desirable. The extruded polymer employed should preferably be capable of being melt drawn to permit the production of fine writing elements at reasonable temperatures. Sharply defined melting points and changes from liquid to viscous-plastic stages may be modified by the presence of minor proportions of copolymers or fillers. The apparent density of the final writing element may vary in accord with the number and void volume of ink-conveying channels formed therein, and the density of the polymeric composition but in the preferred embodiments is rarely more than 5% lower than the density of the polymeric composition.

The ultimate writing element produced in accordance with this invention should be elongated and have a maximum transverse dimension of not over about 0.2", an element having a maximum transverse dimension on the order of 0.03" to 0.12" being preferred. Preferably the cross-sectional area of a cylindrical rod from which the element is made should not exceed 32,000 square mils. Moreover, in order to produce such fine writing element which is capable of supplying ink at a rate which insures uniform laydown of ink and the production of a narrow, sharply defined trace at various writing speeds and with the axis of the element at differing angles and directions of movement to the writing surface, the element herein disclosed must contain a plurality of carefully positioned and arranged ink-conveying channels extending longitudinally from one end to the other of the element.

Exemplary writing instruments in which writing elements of this invention may be employed are generally indicated in FIGS. 1 and 2. As shown in FIG. 1, the instrument may consist of a hollow barrel 1 having a suitably contoured external surface and an internal enlarged chamber whose inner wall is indicated at 2. The forward portion may be provided with a cone-shaped end through which there extends a small port 3 in which the writing element 10 is positioned. A finely porous, absorbent ink reservoir filler 4 (generally made from suitable filamentary material, synthetic, natural or a combination of both) is contained within the chamber 2, the rear open end of such chamber being then closed by means of a plume or plug 5. The forward end of the ink reservoir filler 4 may rest against an inwardly extending stop shoulder 6 and the rear plug 5 may be provided with a central abutment 5' to hold the filler 4 against shifting. Suitable means may be provided for admitting air to the rear portion of the chamber and in the illustrative embodiment, this comprises a minute air opening 7 formed in the forward cone-shaped portion of the writing instrument, the reservoir filler 4 including a longitudinally extending air passageway (which may be a small tube or external groove) capable of permitting air to pass toward the end portion of the reservoir filler and between such filler and the plug 5. In some instances, upstanding ribs are provided on the internal surface 2 of the chamber so as to facilitate the passage of air to the rear portion of the writing instrument.

It is to be noted that the writing element 10 has a forwardly extending contoured writing tip and a sharpened or contoured rear end, this rear end extending into the forward end of the ink reservoir 4. In the somewhat modified construction illustrated in FIG. 2, substantially the same type of barrel is indicated but the writing element 10' is shown provided with a blunt rear end which abuts a small sponge or finely porous and absorbent member 8 which acts as intermediate reservoir between the main ink reservoir 4' and the writing element 10'.

FIGS. 3 and 4 are greatly enlarged views of one form of a writing element 10', FIG. 4 being a side elevation of the forward or point portion of the element and FIG. 3 being a transverse section along plane III—III, through the shank portion of the element. The shank 11 is generally made cylindrical, although it could be polygonal as for example, of hexagonal or octagonal cross-section; as previously indicated, the maximum transverse dimension of the shank generally should not exceed over about 0.2" and preferably be within the range of 0.03" to 0.12". The forward end of the writing element is contoured to provide a terminal writing tip 12 having a smooth external surface. This terminal contoured surface, shown in the illustrated form as extending between zones a—a, is preferably fairly blunt in profile so as to permit adequate contact area between such contoured writing tip and a writing surface throughout a wide range of axial deviation of the writing element from perpendicular to such surface, for example as much as 55°–60°, thereby permitting the user of the instrument to hold it at whatever angle he is accustomed to holding a writing instrument. Moreover, it has been found desirable to have the maximum effective transverse dimension of the contoured tip 12 (at plane a—a) not exceed 50% (and preferably be between about 30% and 40%) of the maximum transverse diameter of the shank 11. In most instances, when the maximum transverse dimension of the shank is in the lower portion of the range indicated above, the maximum transverse dimension of the contoured tip may approach the maximum shank dimension and present a profile resembling a parabola, hyperbola or catenary blending the contoured tip into the shank. In the illustrated exemplary form, the shank 11 is associated with the top portion 12 by means of a frustoconical portion whose surface is confluent with the tip surface and said shank, such frustoconical portion being indicated between the points a and b.

As previously stated, the entire writing element is made of a homogeneous body of synthetic thermoplastic polymer composition and in order to permit it to be used as a writing element, true ink-conveying channels must extend longitudinally throughout this homogeneous mass or body from one end to the other, with particular attention to the supply of ink to the contoured writing tip portion 12. In order to attain the writing ease and flexibility hereinbefore referred to, the writing element is provided with an axial ink-conveying channel 14 open at both ends whereby ink may be supplied to the apex portion of the tip surface 12. In addition, there is a plurality of longitudinally extending parallel circumaxially spaced ink-conveying multi-lobed channels (desirably three or more lobes) in spaced relation and in a circular array around said axial channel, the primary circular array of these being indicated at 15, 15' and the like, such channels extending through said element and emerging through the contoured surface 12 of the writing tip in spaced relation to each other and to the axial channel 14. The total cross-sectional area of the initial circular, circumaxial ink-conveying channels which emerge or debouche onto the contoured tip surface 12 in proximity and spaced relation to the axial channel 14 may be 5 or even 8 or 10 times as large as that of the axial channel. Such arrangement insures an adequate feed of ink when the writing instrument is held at an angle, irrespective of the rapidity or direction of writing. The channels 15, 15' and the like are shown multi-lobed and it has been found desirable to employ a trefoil cross-section of the general character illustrated in FIG. 3 since that form of cross-section provides increased capillarity and permits rapid and continuous flow without interruption or break in the ink column when the instrument is in use, without excessive flow or "gobbing." In addition, such form of section facilitates the contouring operation, provides a smooth surface between channels and eliminates or at least greatly minimizes the flanging or partial blocking of the outlets of such channels during the grinding, machining or contouring operation of these tip surfaces. Moreover, it has been found that multi-lobed channels retain ink in the capillary lobes, which is supplied to the ink in the central, larger portion of each channel and the channels do not dry out but instead stay wet, allowing the instrument to be immediately used even after prolonged non-use.

To illustrate proportions and sizes of channels of the type shown at 15, it may be said that channels having a central circular diameter of about 3.0 mils, each of the arms or lobes being about 1.5 mils in average width and having a length (measured from the center of the central circular channel) of about 5 mils, have been found very effective. During the manufacturing process, extrusion and drawing (described hereafter) may cause the finished channel cross-section to vary from the precise shape of the forming mandrel and such finished cross-section may resemble an equilateral triangle with concave sides and narrow or even pointed apexes; ink contained in these arms or apex portions resists jars and shocks (such as sustained by a dropped writing instrument) and prevents the breaking (discontinuity) of the main column of ink in the intersection of the arms or central portion of the channel; writing starts instantly and constant flow of ink is thereby insured. These narrow arms provide capillaries which feed ink from the reservoir to the contoured writing tip. Some of these advantageous results are not attained when the channels 15, 15', etc. are circular and not lobed.

In addition to the spaced circumaxial inner array of channels 15, 15' and the like, one or more additional outer arrays such as that composed of channels 16, 16' and the like may be provided. Portions of these multi-lobed channels may also emerge on the contoured tip portion 12 or onto the frustoconical portion in the region of the plane a—a. By providing an axial channel and at least one circular array of five or more multi-lobed channels surrounding the central channel, all opening onto the contoured tip surface, the writing instrument is able to write as soon as the top is applied to and moved with relation to a writing surface, irrespective of variation in writing angle, the rotational (axial) angle or direction of movement of such tip. When six such channels 15, 15' etc. comprise the initial circular array, it will be found that at least two of them, as well as the axial channel, will feed and deliver ink under a great variety of angles, rotational displacement, etc.

For fine line writing elements, the initial circular array of multi-lobed channels immediately surrounding the axial channel is preferably embraced by a circle whose diameter is 6 to about 12 times the diameter of the axial channel. In the event an axial channel is not used, the centrally disposed circumaxial array of 5 or more spaced multi-lobed channels (if having a cross-sectional area within the range given hereinbefore) is preferably embraced by a circle whose diameter is on the order of between about 0.01" to about 0.07".

One method of manufacturing the hereinbefore described writing elements in a continuous manner will now be described with reference to FIG. 5 which diagrammatically represents the sequence of operations. As there shown, a heat-jacketed auger-type extruder is indicated at 21, such extruder being provided with driving means 22 and a hopper 23 for feeding solid polymer into the manufacturing system. The polymer is reduced to a melt and is discharged into a die assembly generally indicated at 24. Means may be provided for degassifying the melt received from 21 and before it is impelled into the die assembly. An exemplary die assembly is shown in greater detail in FIGS. 6 and 7. The die assembly 24 may comprise an inlet portion provided with bore 24' (which is supplied with melted polymer composition from extruder 21), a pair of mating spider plates 25 and 25' which hold a flow divider tip 26 and mandrel holder 26', and an outlet or discharge portion provided with discharge orifice 24". Matching arcuate channels 27 and 27' extend through spider plates 25 and 25' so as to allow the polymer composition to flow in the direction of the arrows from inlet bore 24' around divider tip 26, through the spider plates and around mandrel holder 26' into discharge orifice 24". The die assembly is firmly clamped together by suitable means and provided with regulatable heater bands.

Mandrel holder 26' preferably has a conical surface and is provided with an axial hole and a plurality of circumaxial, spaced holes in circular array. A length of open-ended tubing 30 (of suitable metal or alloy) is mounted in each hole, the upstream end of each tube extending into an air chamber 29 formed by opposing recesses in the mating spider plates 25 and 25'. Air or other gaseous medium is conveyed to chamber 29 through channel 29' which is in communication with a source (not shown) of suitable gaseous medium by conduit 29". Each tube 30 constitutes a mandrel. The downstream portions of the mandrel tubes extend in parallel, predetermined array in a central zone of the discharge bore 24" from the conical surface of mandrel holder 26' to about the orifice of bore 24". The axially positioned mandrel tube will form the axial channel 14 while the immediately surrounding circumaxial, spaced, parallel mandrel tubes will form the circular array of channels 15, 15', 15" etc. Since these circumaxial channels are to be of trefoil cross section, the outer surface of each of such circumaxial mandrel tubes is provided with three ribs at 120° to each other. Ribs may be carried by the orifice end portion of each tube or extend longitudinally from the surface of the mandrel holder to the open end of each mandrel tube of such array, as more clearly shown in a greatly enlarged fragmentary section and end view (FIGS. 8 and 9) of a single mandrel tube 30 with its three attached lobe forming ribs 30', 30" and 30''' as held by the mandrel holder 26'. It is to be understood that the drawings here presented are somewhat diagrammatical and simplified to facilitate understanding and not limiting. Additional mandrels may be carried (radially outward of the inner circumaxial array) to form additional ink-conveying channels such as those indicated in FIG. 3 at 16, 16', etc. All mandrels are preferably hollow to permit air or other gaseous, non-reactive medium to be supplied (at a pressure of not over 1 or 2 lbs. gauge) to the channels being formed in the extruded plastic indicated at 31 (FIG. 7).

It may be noted that the outlet orifice of the die has a transverse dimension which may be between 4 to 7 times the maximum transverse dimension of the ultimate product to be manufactured. The discharge orifice from the die is preferably directed downwardly and a melt draw operation takes place at 31 which represents the extruded plastic body on its way to a quenching tank 32 provided with a constant flow of cooling fluid, inlets and outlets being indicated at 33 and 33', respectively. The quench tank 32 is preferably provided with a plurality of roller guides 34 adapted to maintain the extruded object along a definite path of travel, this object being pulled out of the quench tank by the puller indicated at 35. A sufficient tension (plus the initial gravity flow of the extruded object) is maintained by the puller 35 so that a reduction in the overall size or diameter of the extruded writing element takes place, such reduction being down to between 20% and 50% of the extrusion orifice diameter and preferably to the lower portion of this range say, 25%–35%. It is to be understood that during this melt drawing and other drawing operations, not only is the external dimension of the object reduced but similarly, the internal cavities or channels are similarly reduced in size although their positions and spacing relative to each other are maintained.

The continuous rod of writing element may now be drawn through a heating oven or zone 36 where the rod is heated to below the melting point of the polymer but sufficiently to allow additional drawing, this temperature being generally from 5° to 25° below the melting point. The rod is drawn through the heating zone 36 and the subsequent quenching zone 37 (which may be a spray booth) by means of the puller 38 and in this operation, termed "cold drawing," the external dimensions of the rod are reduced to the desired external dimension of the final product. Although the product discharged by the puller 38 may be used in its then existing form, it has been found desirable, in order to modify and improve the tensile and wear resistance properties of the polymer, as well as its machinability, to subject the rod to the further step of drawing it through an annealing oven indicated at 40 and a cooling zone 41 by means of the final puller 42. The product discharged by puller 42 can then be wound upon large storage reels indicated at 44 or sent directly to cutting and contouring apparatus generally indicated at 45.

It may be noted that the cold drawing operation in elements 36 and 37 not only facilitates the attainment of a uniform final maximum transverse dimension, but also tends to orient the polymer. This is of advantage in that solubility of the polymer decreases with crystallinity, and orientation and toughness is increased by moderate crystallinity.

Difficulties were encountered in attempting to manufacture the specific form of writing element whose cross section is illustrated in FIG. 3 at the rate required to supply the potential millions of writing tips per year, at a low cost. Production and maintenance of the array of very small mandrels presented problems and, as previously indicated, there was the problem of maintaining channels of 3 mils diameter in the axial area of the body of polymeric composition. Changes and modifications were made and the following preferred method of manufacture was developed, this being diagrammatically illustrated in FIGS. 10(a) and 10(b) and suited to the manufacture of tips such as shown in FIG. 3 and also to writing elements having a cross section of the type illustrated in FIG. 13.

The cross section of the preferred writing element 10" of FIG. 13 is similar to that of FIG. 3 in that the body is of homogeneous polymeric composition, which has a longitudinally extending axial ink-conveying channel 54 and circumaxial, spaced ink-conveying channels 55, 55', 55", etc. The axial channel 54 has a cross-sectional area equivalent to a circle of about 4 mils in diameter (2–4 mils is desirable) and the six enlarged circumaxial ink-conveying channels 56, 56', 56", etc. are oblongs approximately 1–3 mils wide and 3–5 mils in a radial direction. Each of these circumaxial channels 55, 55', 55", etc. is connected to the axial channel by a capillary channel 56, 56', 56", each of which narrows to between 0.4 mil and 1.0 mil at an intermediate zone, thus facilitating feeding of ink from the reservoir to the tip, holding and feeding reserve ink available to both axial and circumaxial channels. Each arm extending radially from the axial channel 54 therefore includes an enlarged end portion such as 55 and a capillary portion such as 56 with a constriction 57 therebetween. The various channels may vary in number but extend from end-to-end of the writing element and emerge and traverse upon the contoured surface of the writing tip end. The writing element meets all of the demanding requirements previously referred to herein. It may be stated that the arms or radial channels are spaced by V-shaped solid body portions such as 58 whose ends provide smooth surfaces for the contoured writing tip.

Since the equipment used in continuously manufacturing the preferred embodiment exemplified by FIG. 13 is in large part similar, if not identical, to that shown in FIG. 5, the same numerals are used in FIGS. 10(a) and 10(b) to identify similar equipment and operating zones.

The manufacturing process illustrated in FIG. 10(a) includes an extruder 21 for a polymeric composition, which is supplied in granular form from a hopper 23, the extruder being provided with a variable speed drive 22 and suitable heating means. The melted composition is forced through a die 24 in a downward direction, the outlet of the die being at a controlled distance above the body of quenching liquid in the quenching zone 32. The extrudate, indicated at 31, is subjected to a melt draw, being pulled into and through the quenching zone by a puller 35 (called a catapuller); the quenching bath is sufficiently deep to ensure that the extrudate is sufficiently chilled while moving in a vertical direction to retain its form without deformation when passing under rollers 34 and out of the chilling zone. The rate of pull, the distance between the die outlet and the quenching zone, the time of residence of the extrudate in the quenching zone, and the rate at which the auger of the extruding device operates are correlated so as to ensure the discharge from the quenching zone of an extrusion in the form of a strong rod having a cross-sectional area of not more than about one-fourth of the cross-sectional area of the extrusion die. Ordinarily the ratio of initial diameter of the extrusion outlet and the diameter of the rod after passing through the quenching bath is on the order of 2:1–5:1 although ratios of 3:1–4:1 are preferred.

In order to eliminate repetition of subsequent process steps, the diameter of the rod discharged from the quenching zone 32 should not exceed diameter of the desired final product by more than between about 3% and 20%, and preferably be between only about 4% and 10% larger.

To obtain the desired arrangement of channels of the product embodiment shown in FIG. 13 by the use of the process steps hereinafter described, the mandrel holder 26' of the extrusion die carries a mandrel 60 (FIG. 11) extending axially through the discharge orifice of the die. As shown in FIG. 11, the mandrel comprises an axial portion 64 and a plurality of radiating arms 62 (six in this example), each arm having an enlarged outer end 65, 65', 65'', etc. which is preferably larger in diameter (or in maximum thickness) than the diameter of the axial portion 64; end portions 65 having a maximum thickness of between 1.5 and 2.5 times the effective diameter of the axial portion 64 give good results. The external surfaces of each arm may be planar and divergent as shown; one surface of each arm is preferably provided with a longitudinally extending V-shaped groove (66, 66', 66'') the grooves facing in the same rotational direction about the axis. Each groove may be located at between about 25% and 50% of the radial extent of an arm 62, measured from its outer enlarged end. The enlarged ends of the arms 62 may be provided with axial channels or bores 68 in communication with air supply means in the die assembly.

A mandrel of the type of 60 is notably strong, provides an axial portion of minimal diameter and results in the production of a writing element of the character shown in FIG. 13, when treated as hereafter stated.

The chilled rod pulled out of the quenching zone 32 by puller 35 (FIG. 10(a)) is then preferably drawn through a drier 70 of any desired type (air blast, vacuum, wiping roll, or the like) and then through a reheating and channel correcting zone 71, the reheating zone or oven being indicated at 36. The rod is heated at 36 to between about 75° and 130° F. below the melting point of the polymeric composition at which temperature the rod may be worked or subjected to plastic flow by compressive and elongative forces which are applied to the heated rod in the channel-correcting zone 72.

FIG. 12 diagrammatically illustrate in longitudinal section a simple form of device which, in conjunction with the sequence of operations, the temperature of the rod and the rate of pull of puller 42, reduces the excessively large channels in the rod entering the reheating zone 36 to desired size and arrangement, ensures that the total cross-sectional area of the channels constitutes less than about 4% of the gross cross-sectional area of the rod, and also preferably reduces the diameter of the rod by between 3% and 10%. The device of FIG. 12 comprises the channel—correcting zone 72 utilizes a two-part die having a polished bore 73 of the diameter desired in the ultimate rod product; the axial length of this cylindrical bore may be about one-third to one-half of its diameter. The entry 74 of the bore may be generally in the form of a truncated cone having an apex angle of between about 20° and 35°; the exit from the bore may lead into an enlarged counter bore 75.

Having established the final diameter (or external contours) of the rod and caused the polymeric composition to move toward the axial portion of the rod in zone 72, the rod is pulled through a cooling or quenching zone 37 and a secondary drier 70' by a puller 42. It may be noted that the rate of pull of the rod by puller 42 is somewhat faster than that of puller 35 and the rod is subjected to greater tension while passing through zones 72, 37, and 70'.

The rod may then be wound upon the large takeup reel 44, stored or sent to a production line to be cut and have the ends contoured into writing points. However, in many instances it is desirable to relieve internal stresses in the rod and to stabilize it. Such stabilization is illustrated in FIG. 10(b) wherein the rod (made as previously described) may be pulled from reel 44' by a set of rolls 80 and sent to a stabilizing zone 81 from which it is drawn by a second set of rolls 82, the rolls 80 and 82 being controlled to maintain the rod under tension sufficient to prevent the polymeric composition from relaxing to its melt-drawn condition. The stabilizing zone 81 is provided with heating means whereby the rod is heated to about between 20° and 100° F. below the melting point of the polymeric composition, and then air cooled before passing through rolls 82. The stabilized and annealed rod may then be cut and contoured (operations indicated at 83 for use in writing instruments.

I claim:

1. In a continuous method of making elongated objects composed of a homogeneous thermoplastic polymeric composition and adapted for use as points in writing instruments, said objects being homogeneous, strong, resistant to normal wear, having a cross-sectional area not exceeding about 32,000 square mils and containing a plurality of liquid-conducting channels extending longitudinally therethrough, the total cross-sectional area of such channels constituting less than about 4% of said gross area, the steps of:

continuously extruding a thermoplastic polymeric composition heated to fluidizing temperature at a superatmospheric pressure through a die having a circular outlet provided with an axially positioned mandrel with a plurality of radially extending fins, and subjecting the extrudate to a melt draw by pulling the extrudate into and through a quenching zone;

controlling the rate of pull, the distance between the die outlet and the quenching zone and the time of residence of the extrudate in the quenching zone to ensure the discharge from the quenching zone of an extrusion in the form of a strong rod having a cross-sectional area of not more than about one-fourth of the cross-sectional area of the extrusion die outlet;

and then pulling the rod through reheating and channel-correcting zones, said rod being heated to between about 25° and 130° F. below the melting point of the polymeric composition in the reheating zone and such reheated rod subjected to compressive and elongating forces in the channel-correcting zone to reduce the effective width of the channels, whereby the total cross-sectional area of said channels constitutes less than about 4% of the gross cross-sectional area of said rod.

2. A method as stated in claim 1 wherein the compressive and elongating forces in the channel-correcting zone are controlled to reduce the size of the axial channel to an average width of between 2 and 5 mils and the width of channels formed by each of said radial fins is reduced to within a range of between 0.4 and 3 mils, about one-half of each such channel extending radially outward from the axial channel having a width of between about 0.4 and 1.5 mils.

3. A method as stated in claim 2 wherein the forces applied in the channel-correcting zone are sufficient to reduce the diameter of the rod entering said zone by between 3% and 10%.

4. A method as stated in claim 2 wherein the rod is pulled out of the channel-correcting zone at a faster rate than the rate at which the rod is pulled out of the quenching zone.

5. A method as stated in claim 1 including the steps of continually pulling the rod from the quenching zone through a drying zone before its passage through reheating zone, and subjecting the rod discharged from the channel-correcting to quenching and drying operations.

6. A method as stated in claim 5 followed by stabilization of the rod by subjecting the rod to a temperature of between about 10° F. and 100° F. below the melting point of the polymeric composition while said rod is under tension, and cooling the rod.

7. In a method of continuously making elongated unitary and homogeneous writing elements composed of a homogeneous mass of synthetic thermoplastic polymer, said writing elements having a plurality of circumaxial open-ended, ink-conveying channels, the steps of:

melting and extruding a synthetic thermoplastic polymer through a die having a discharge orifice whose maximum transverse dimension is 7 to 15 times the maximum transverse dimension of the final writing element desired, said die including a plurality of mandrels in circumaxial spaced relation to an axially positioned mandrel;

gently drawing the extrusion while cooling to a plastic stage into a quenching bath to reduce the transverse diameter of the extrusion to between 25% and 50% of the extrusion orifice size;

cooling the thus drawn extrusion to below plastic temperature stage in the quenching bath;

and then subjecting the extrusion to a further drawing under tension at a temperature below the melting point of the polymer to further reduce the transverse dimension of the extrusion to that desired in the final writing element.

8. In a method as stated in claim 7 the further steps of cooling the extrusion and subjecting it to annealing tension to relieve strains and modify tensile and wear properties.

9. In a method as stated in claim 7 wherein the axial channel and not less than six circumaxial spaced channels are not interconnected and are formed within an axial area of the extrusion having a diameter not exceeding 50% of the maximum transverse dimension of the extrusion.

10. In a die for extruding a thermoplastic polymeric composition for melt-drawing, said die having a discharge bore, the provision of a mandrel mounted axially within said discharge bore, said mandrel including a small diameter, longitudinally extending axial portion and a plurality of radially extending spaced arms carried by the axial portion and extending longitudinally thereof, the radially outer end of each arm being of appreciably greater thickness than the diameter of the axial portion, each of said arms being provided with virtually planar diverging side surfaces, one surface of each arm including a longitudinally extending groove spaced from the outer end of the arm.

11. In a die as stated in claim 10 wherein the outer end portion of each arm has a maximum thickness between about 1.5 and 2.5 times the diameter of the axial portion.

12. In a die as stated in claim 10 wherein the grooves of said arms face in the same rotational direction.

References Cited

UNITED STATES PATENTS

| Number | Date | Name | Class |
|---|---|---|---|
| 1,874,503 | 8/1932 | Greenwood | 425—463 |
| 2,965,925 | 12/1960 | Dietzsch | 161—178 |
| 3,164,947 | 1/1965 | Gaston | 264—177 R |
| 3,306,267 | 2/1967 | Matsumoto | 401—292 |
| 3,518,019 | 6/1970 | Nakamura | 401—265 |
| 3,586,454 | 6/1971 | Funahashi | 401—292 |
| 3,614,247 | 10/1971 | Otsuka | 401—199 |
| 3,338,216 | 8/1967 | Roller | 401—292 |
| 2,804,645 | 9/1957 | Wilfong | 264—177 Z |
| 2,965,925 | 12/1960 | Dietzsch | 161—178 |
| 3,197,812 | 8/1965 | Dietzsch et al. | 161—178 |
| 3,394,213 | 7/1968 | Roberts et al. | 264—177 Z |
| 3,433,857 | 3/1969 | Dutton et al. | 264—177 Z |
| 3,400,998 | 9/1968 | Daugherty et al. | 401—198 |
| 3,442,739 | 5/1969 | Johnson | 156—180 |
| 3,467,564 | 9/1969 | Daugherty et al. | 214—347 |
| 3,607,596 | 9/1971 | Fairbanks | 264—167 |
| 3,623,941 | 11/1971 | Goodenow et al. | 161—175 |
| 3,512,214 | 5/1970 | Shila et al. | 264—176 Z |

FOREIGN PATENTS

| Number | Date | Country | Class |
|---|---|---|---|
| 1,519,960 | 4/1968 | France | 264—177 F |
| 566,014 | 8/1957 | Italy | 264—177 F |
| 630,526 | 12/1961 | Italy | 264—177 F |
| 3,627,868 | 12/1971 | Funahashi | 264—171 |

JAY H. WOO, Primary Examiner

U.S. Cl. X.R.

156—167; 161—178; 264—164, 210 F; 401—265, 292; 425—463, 467